United States Patent [19]

Chen

[11] Patent Number: 5,281,044
[45] Date of Patent: Jan. 25, 1994

[54] LOCKING DEVICE FOR A GOLF TROLLEY

[76] Inventor: Jueh-Cheng Chen, No. 42, Shing-Ro Rd., Tainan City, Taiwan

[21] Appl. No.: 986,919

[22] Filed: Dec. 8, 1992

[51] Int. Cl.$^5$ .......................... F16B 21/18; B62B 1/04
[52] U.S. Cl. ...................................... 403/328; 403/79; 280/DIG. 6
[58] Field of Search .................. 403/79, 83, 84, 88, 403/106, 59, 150, 328, 327, 326, 325, 321; 280/DIG. 6

[56] References Cited

U.S. PATENT DOCUMENTS

| | | | |
|---|---|---|---|
| 2,046,342 | 7/1936 | Muck et al. | 403/328 |
| 4,504,167 | 3/1985 | Nakanishi | 403/328 |
| 4,946,186 | 8/1990 | Cheng | 280/DIG. 6 |
| 4,961,593 | 10/1990 | Sanders et al. | 280/646 |
| 5,048,856 | 9/1991 | Sanders et al. | 280/646 |

Primary Examiner—Richard K. Seidel
Assistant Examiner—Erik R. Puknys
Attorney, Agent, or Firm—Lucas & Just

[57] ABSTRACT

A golf trolley includes a stationary tube and a push tube which has one end connected pivotally to the stationary tube. A locking device includes an engaging bolt provided on the stationary tube and a lock casing which is provided on the push tube and which has a blind bore to receive the engaging bolt therein. A press member extends through the lock casing. When the push tube is pivoted relative to the stationary tube so as to place the push tube in a substantially parallel position with respect to the stationary tube, the engaging bolt extends into the blind bore of the lock casing, and the press member locks the engaging bolt in the blind bore of the lock casing.

3 Claims, 12 Drawing Sheets

LOCKING DEVICE FOR A GOLF TROLLEY

BACKGROUND OF THE INVENTION

1. Field of the Invention

The invention relates to a locking device, more particularly to a locking device which is to be installed on a golf trolley.

2. Description of the Related Art

FIG. 1 shows a perspective view of a conventional golf trolley that includes a stationary tube (A) which is provided with a lower bag support (F), an upper bag support (E), a moving wheel set (G), and a push tube (C) which is connected to the stationary tube (A) by means of a bracket (B) and a locking device (D). The push tube (C) has a grip portion (H) provided at the topmost end thereof.

FIGS. 2 and 3 respectively illustrate an exploded view and an assembled view of the stationary tube (A) and the push tube (C). As illustrated in FIG. 2, the push tube (C) has a lower end (C1) which is connected pivotally adjacent to an upper end (A1) of the stationary tube (A) by means of the bracket (B). The locking device (D) includes a sleeve member (D2), which is sleeved slidably on the push member (C), and an inverted U-shaped member (D1) which is connected to the sleeve member (D2) by means of an engaging screw (D3). The inverted U-shaped member (D1) is formed with a cavity (D12) which receives the upper end (A1) of the stationary tube (A). The push tube (C) is pivoted upward relative to the stationary tube (A), and the inverted U-shaped member (D1) is slid downward so as to permit the upper end (A1) of the stationary tube (A) to extend into the cavity (D12), thereby locking the two tubes (A, C) together so as to retain the golf trolley in an operable position, as shown in FIG. 3. The above operation is conducted in a reverse sequence so as to disengage of the upper end (A1) of the stationary tube (A) from the locking device (D) in order to permit pivoting movement of the push tube (C) relative to the stationary tube (A), thereby placing the golf trolley in a folded position, as shown in FIG. 4.

A main drawback of the aforementioned golf trolley is that the locking device (D) must be held manually on the push tube (C) above the upper end (A1) of the stationary tube (A) during the pivotal action of the push tube (C) relative to the stationary tube (A). Otherwise, the locking device (D) will slide downward and abut against the stationary tube (A), which consequently prevents pivotal action of the push tube (C) relative to the stationary tube (A). Thus, locking of the push tube (C) to the stationary tube (A) is hindered and causes some inconvenience to the user.

SUMMARY OF THE INVENTION

A main object of the present invention is to provide a locking device for locking the push tube to the stationary tube of a golf trolley, which device is more convenient to use when compared to the prior art.

According to the present invention, the locking device includes an engaging bolt provided at an upper end of the stationary tube of the golf trolley and an elongated lock casing provided adjacent to a lower end of the push tube of the golf trolley. The lower end of the push tube is connected pivotally adjacent to the upper end of the stationary tube. The elongated lock casing is fixed on the push tube adjacent to the lower end thereof. The lock casing has a cavity, which is formed at an upper portion of the lock casing and which receives a compression spring therein, an elongated slot which extends from the upper portion to a lower portion of the lock casing, and a blind bore which passes transversely through said elongated slot and which can receive the engaging bolt therein. A press member is provided in the cavity of the lock casing. The press member includes an enlarged head, which protrudes out of the lock casing and an elongated plate which is formed integrally with the enlarged head and which extends through the compression spring and the elongated slot of the lock casing. The elongated plate has an oval-shaped opening which permits a locking bolt to extend therethrough, thereby engaging the press member movably in the lock casing. The elongated plate of the press member further has a circular opening which is disposed adjacent to the oval-shaped opening thereof and which receives resiliently and engageably the engaging bolt of the stationary tube when the push tube is pivoted upward relative to the stationary tube, thereby locking the push tube in a position which is parallel to the stationary tube. Depression of the press member and a pivotal action of the push tube relative to the stationary tube result in the disengagement of the engaging bolt from the lock casing of the push tube.

BRIEF DESCRIPTION OF THE DRAWINGS

Other features and advantages of the present invention will become more apparent in the following detailed description, including drawings, all of which show a non-limiting form of the present invention, and in which.

DETAILED DESCRIPTION OF THE PREFERRED EMBODIMENT

Figure 1:
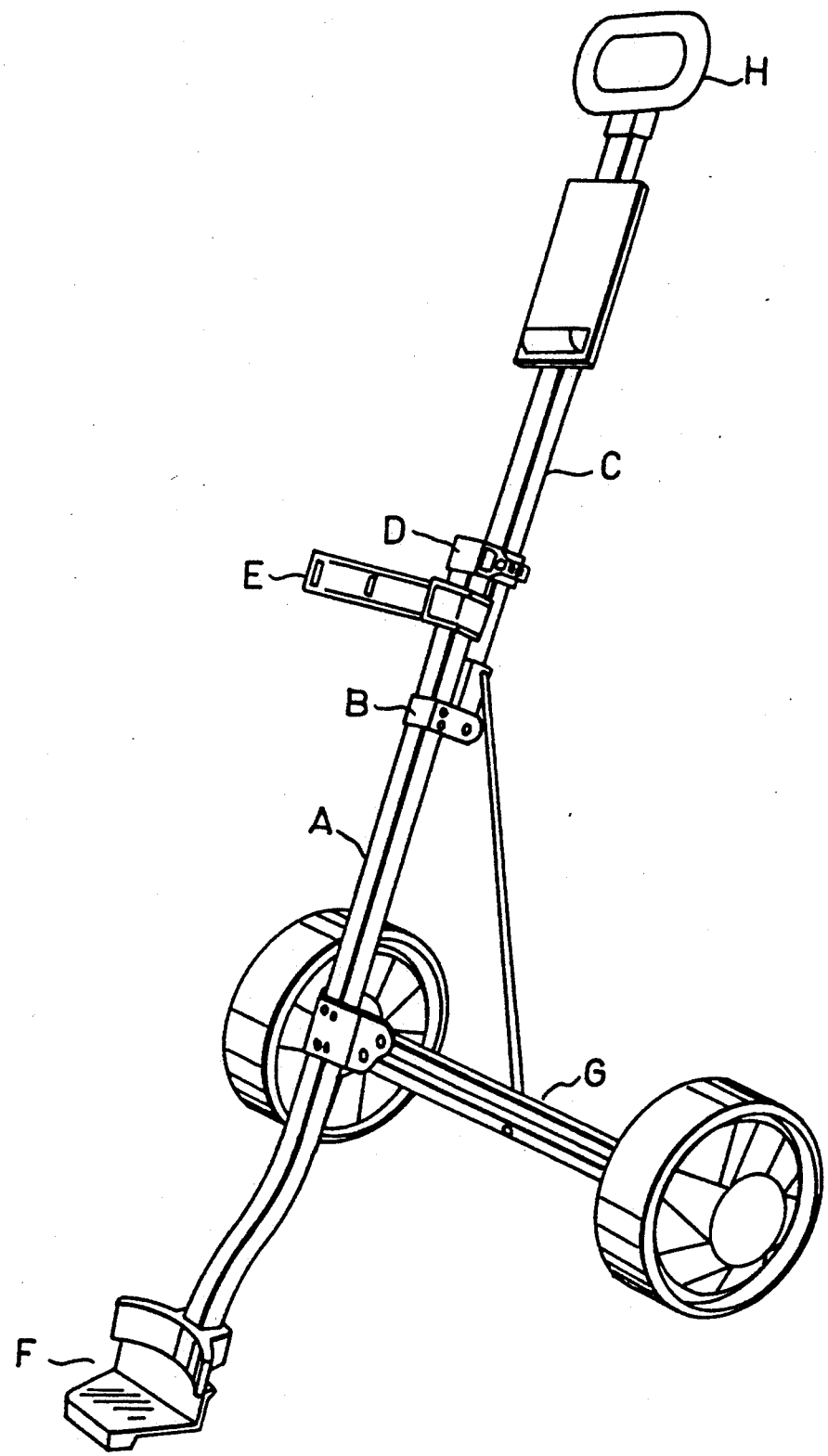
FIG. 1 shows a perspective view of a golf trolley of the prior art.
Figure 2:
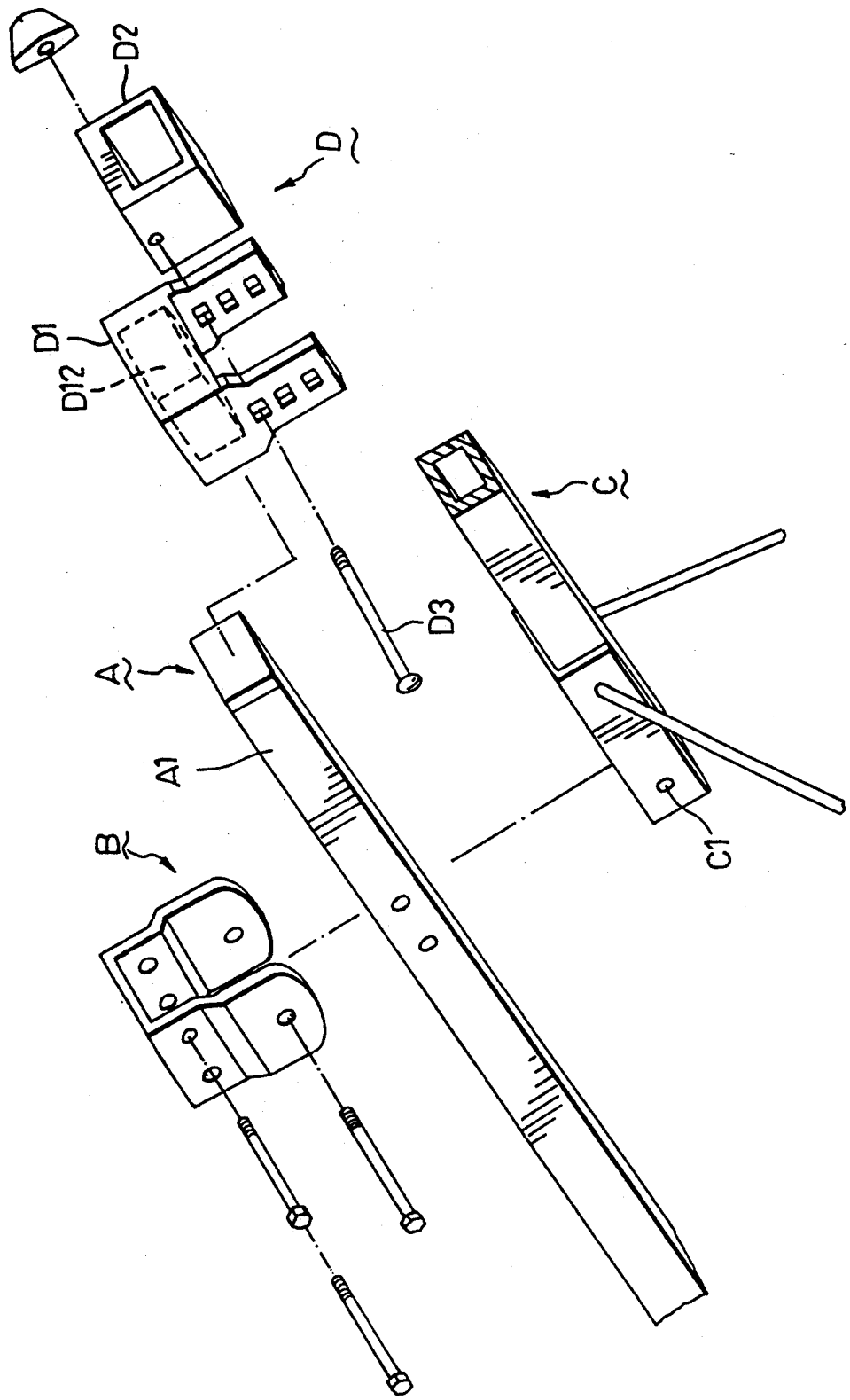
FIG. 2 shows an exploded view of a locking device that locks a stationary tube and a push tube of the golf trolley of FIG. 1.
Figure 3:
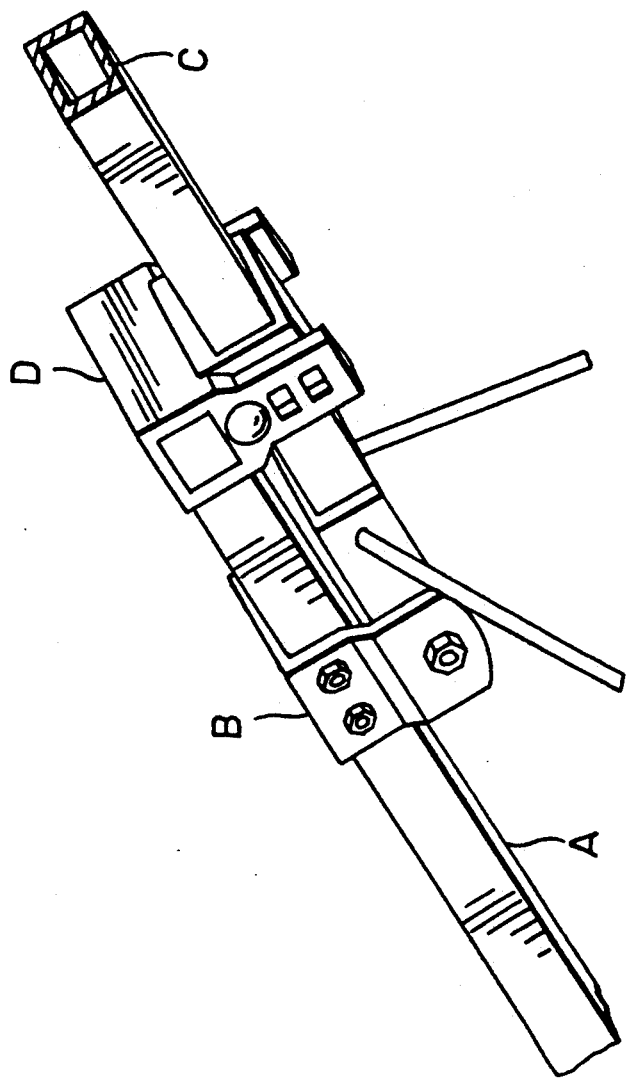
FIG. 3 is an enlarged view of a part of the golf trolley shown in FIG. 1, the stationary tube and the push tube of the golf trolley being locked by the locking device shown in FIG. 2.
Figure 4:
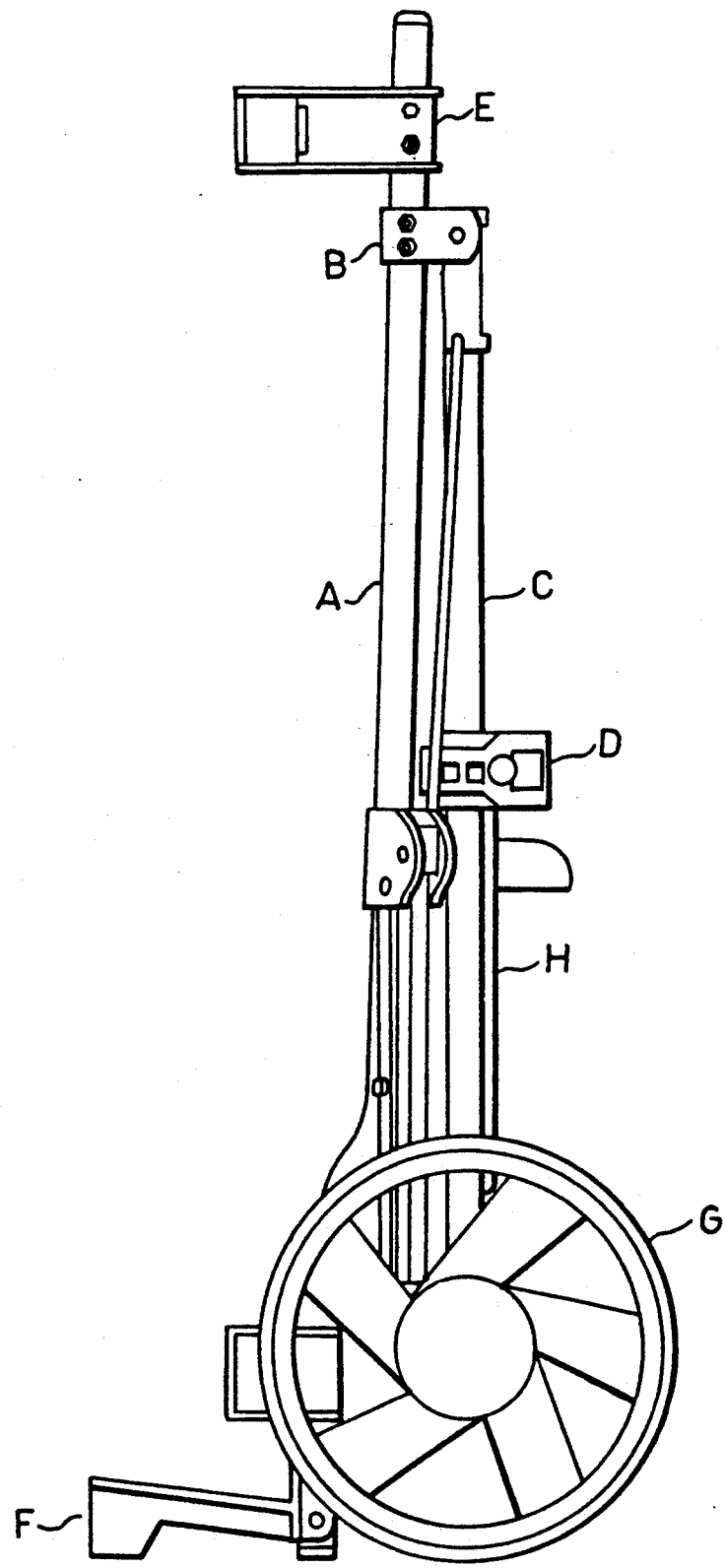
FIG. 4 shows the golf trolley of the prior art when in a folded position.
Figure 5:
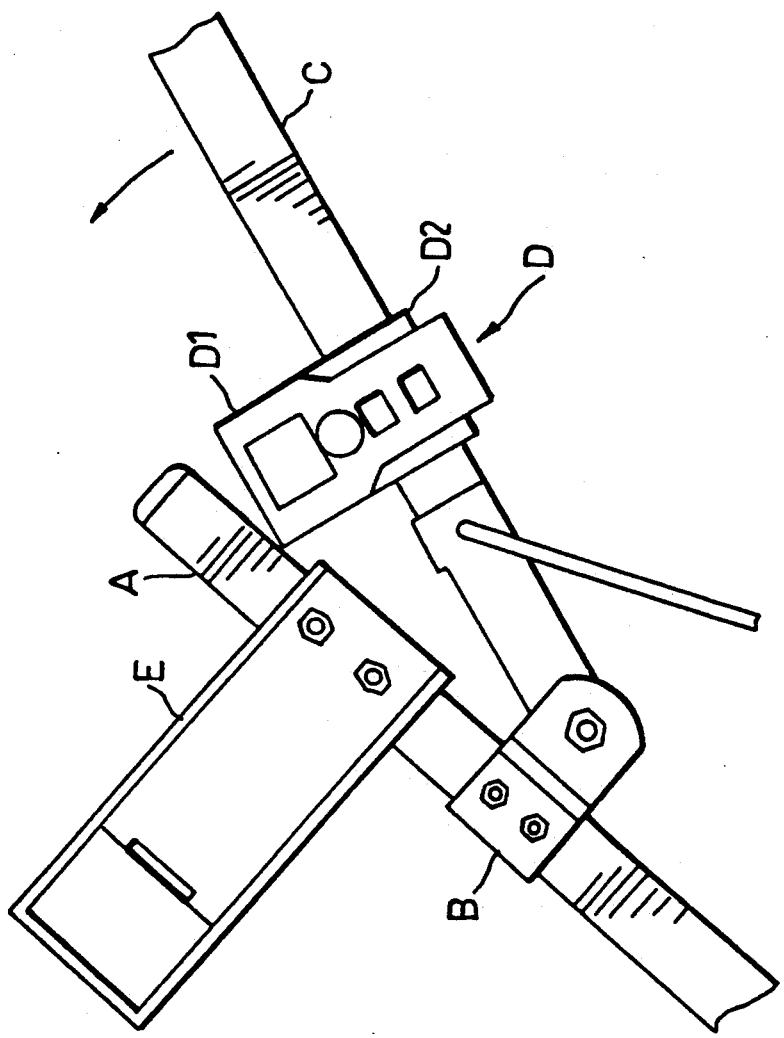
FIG. 5 illustrates the locking of the conventional golf trolley when the push tube is pivoted relative to the stationary tube.
Figure 6:
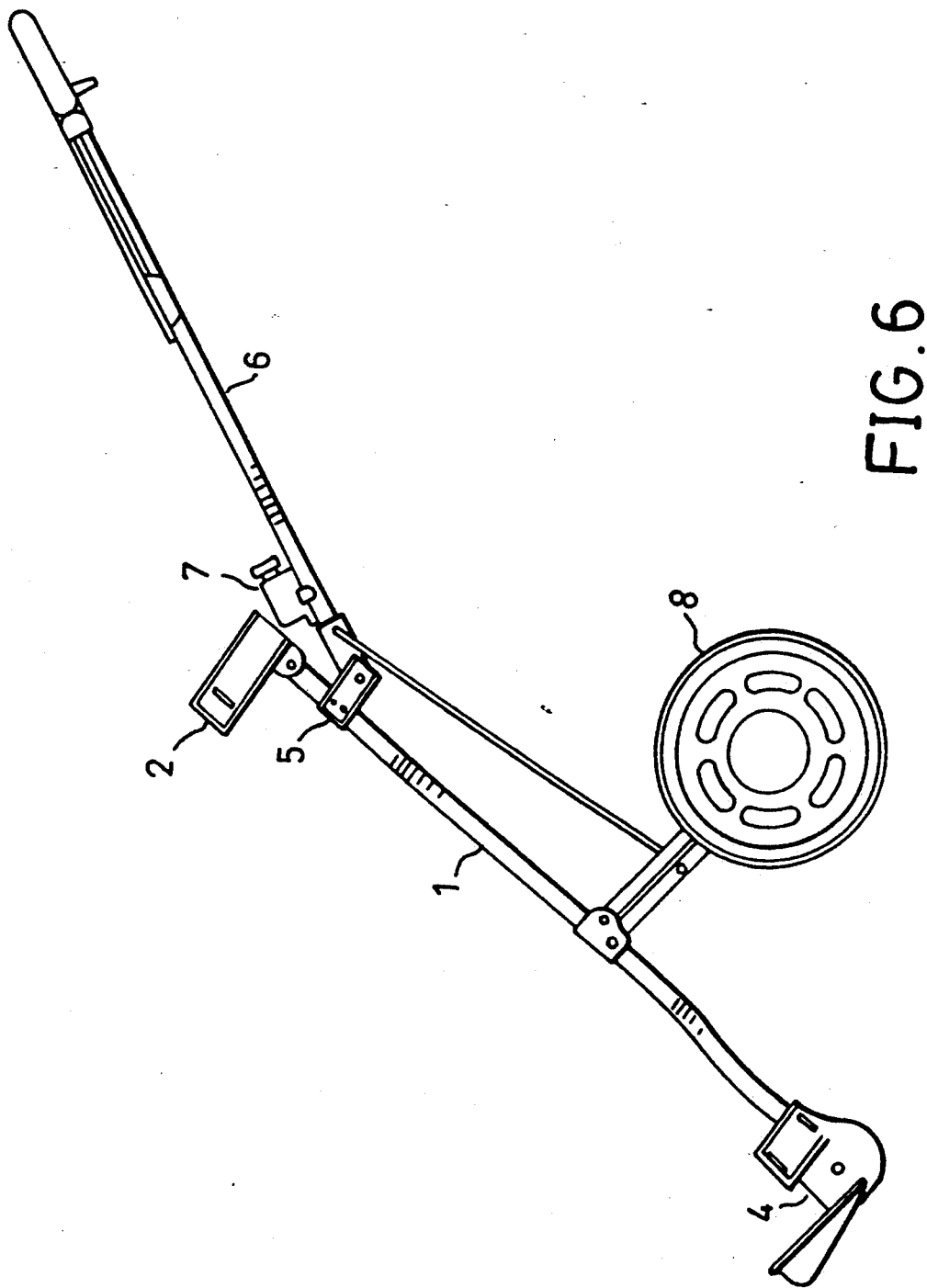
FIG. 6 shows a side view of a golf trolley which is equipped with a locking device of the present invention.
Figure 7:
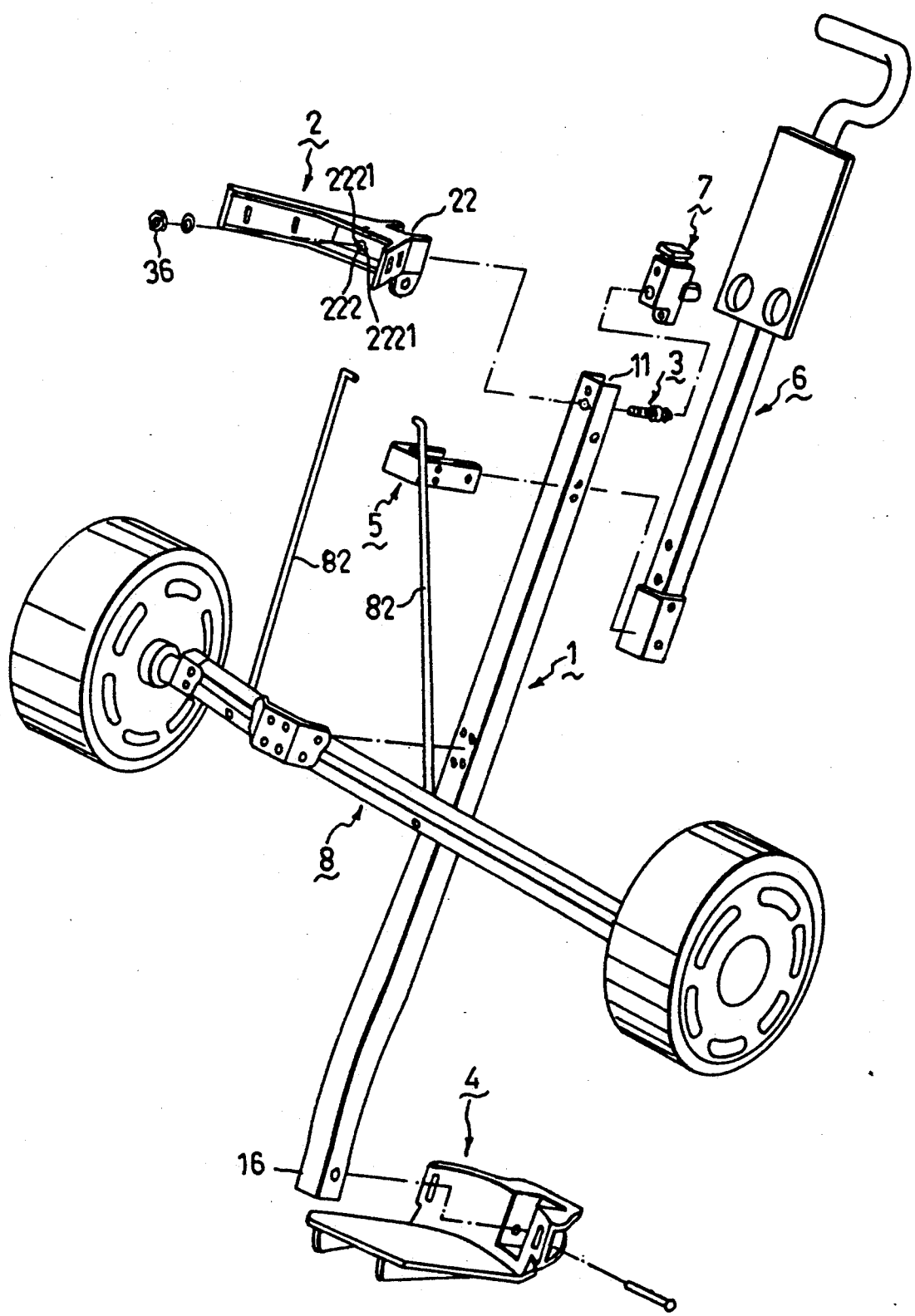
FIG. 7 is an exploded view of the golf trolley shown in FIG. 6.

FIGS. 6 and 7 respectively show a side view and an exploded view of a conventional golf trolley that includes a stationary tube (1) and a push tube (6) which has a lower end connected pivotally to the stationary tube (1) by means of a bracket (5). The stationary tube (1) has a lower bag support (4), an upper bag support (2), and a set of moving wheels (8) mounted thereon. The set of moving wheels (8) further includes a pair of connecting ribs (82) that are connected to the push tube (6) in such a manner that pivotal action of the push tube (6) relative to the stationary tube (1) can place the wheels (8) in an operable position or in a folded position.

According to the present invention, a locking device includes a lock casing (7) and an engaging bolt (3) that is adapted to be received in the lock casing (7). The locking device is to be installed in the aforementioned golf trolley.

The stationary tube (1) in the preferred embodiment is U-shaped in cross section and defines a receiving space (11) therein. The upper bag support (2) has a bifurcated end (22) provided across an upper end of the stationary tube (1) and is fixed thereon by means of screws. The upper bag support (2) further has a retaining hole (222) with two symmetric notches (2221) formed thereat.

Figure 10:
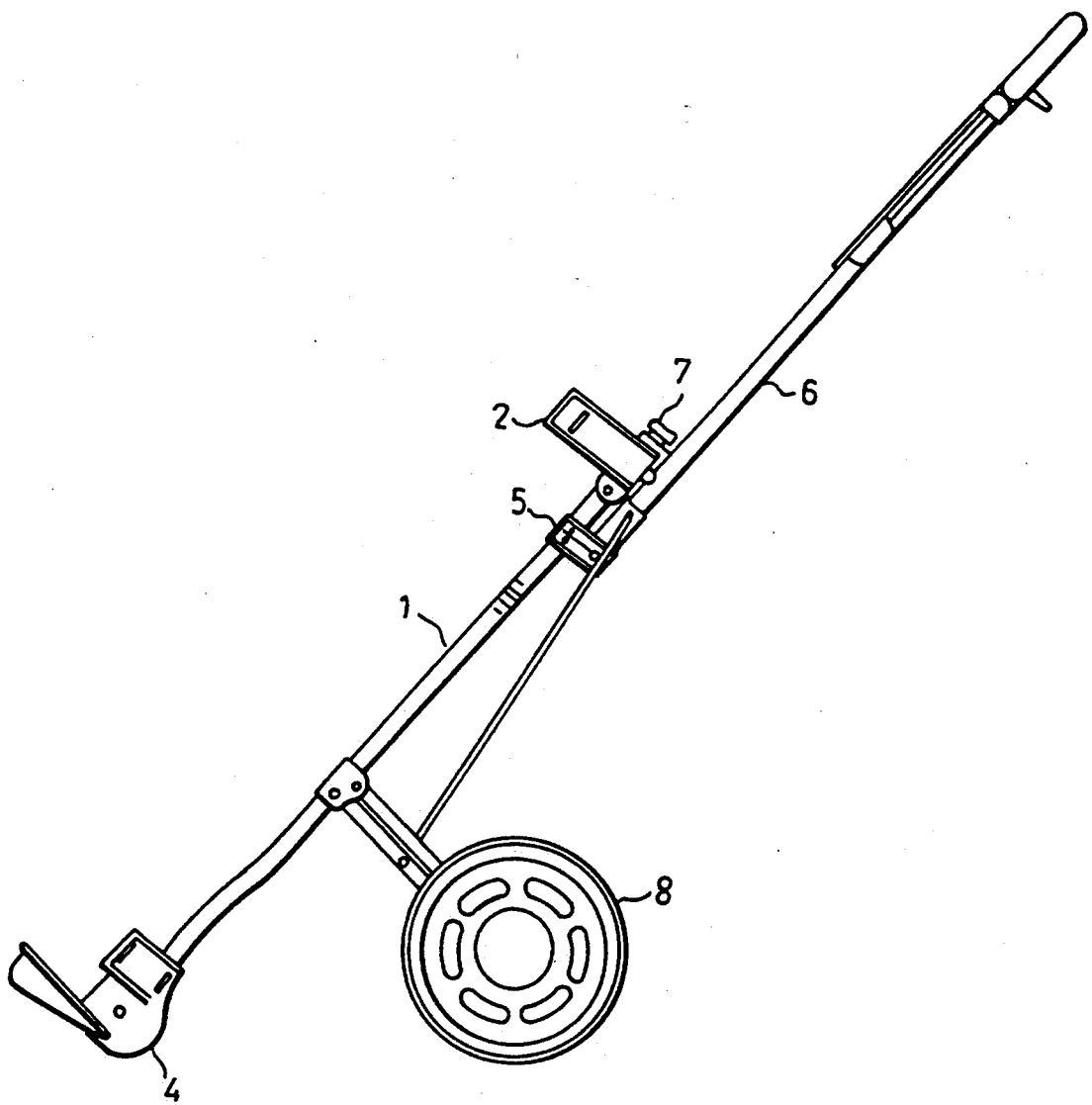
FIG. 10 shows a perspective view of a golf trolley in which the locking device of the present invention locks the stationary and push tubes so as to retain the golf trolley in an operable position.
Figure 11:
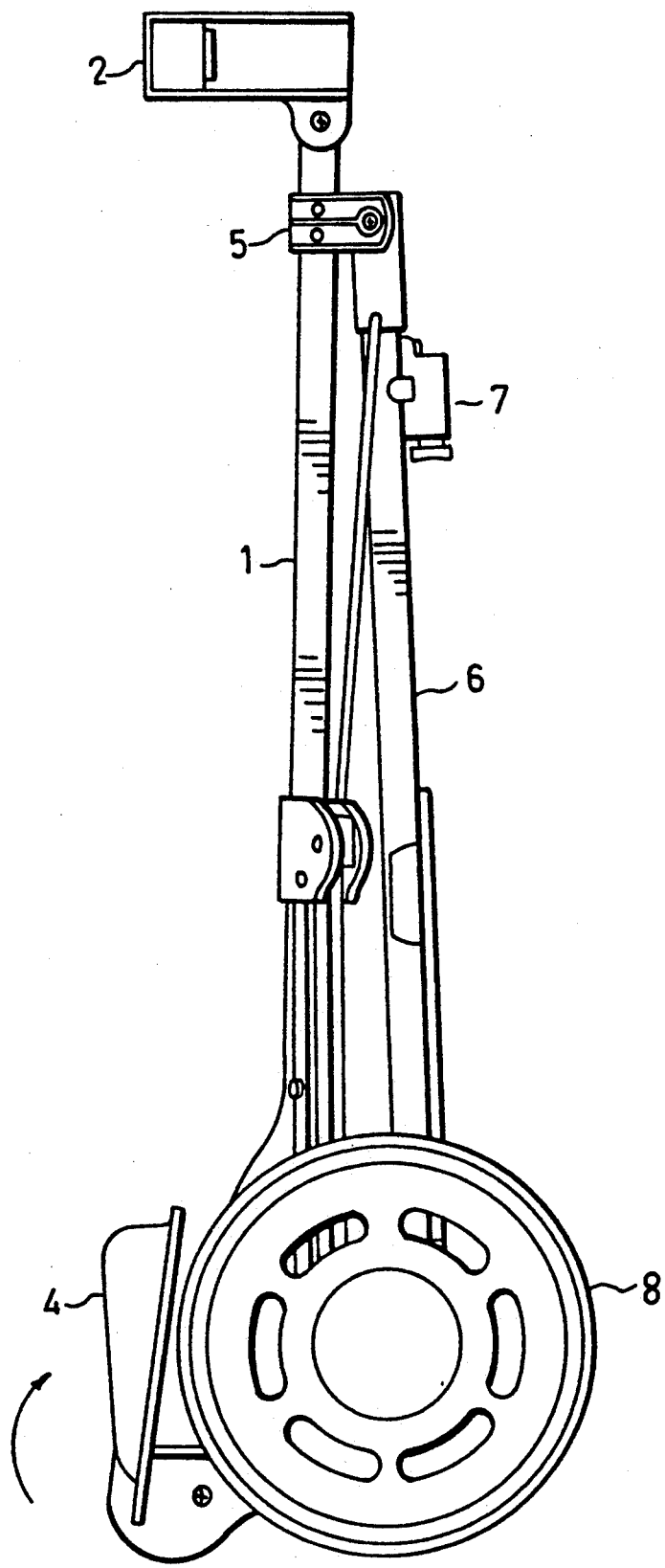
FIG. 11 shows the golf trolley of FIG. 10 when in a folded position.

Conventional methods are used when fixing the lower bag support (4) to the lowermost portion (16) of the stationary tube (1) so that the lower bag support (4) can be placed in a stretched out position to support a golf bag, as shown in FIG. 10, and in a folded position, as shown in FIG. 11, so as to occupy minimum space when the golf trolley is not in use.

Figure 8:
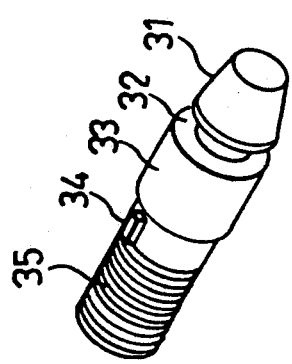
FIG. 8 shows an engaging bolt of the locking device of the present invention.

Referring to FIG. 8, the engaging bolt (3) of the locking device according to the present invention includes a threaded section (35), a stop member (34), a tapered head (31) and a cylinder member (33) formed adjacent to the tapered head (31). An engaging groove (32) is formed between the cylinder member (33) and the tapered head (31). The threaded section (35) is inserted through the stationary tube (1) and the retaining hole (222) of the upper bag support (2). The stop member (34) extends into one of the notches (2221) of the retaining hole (222) to prevent the rotation of the engaging bolt (3) relative to the stationary tube (1). A nut (36) engages threadedly the threaded section (35) of the engaging bolt (3) so as to secure the latter on the stationary tube (1), as shown in FIG. 12.

Figure 9:
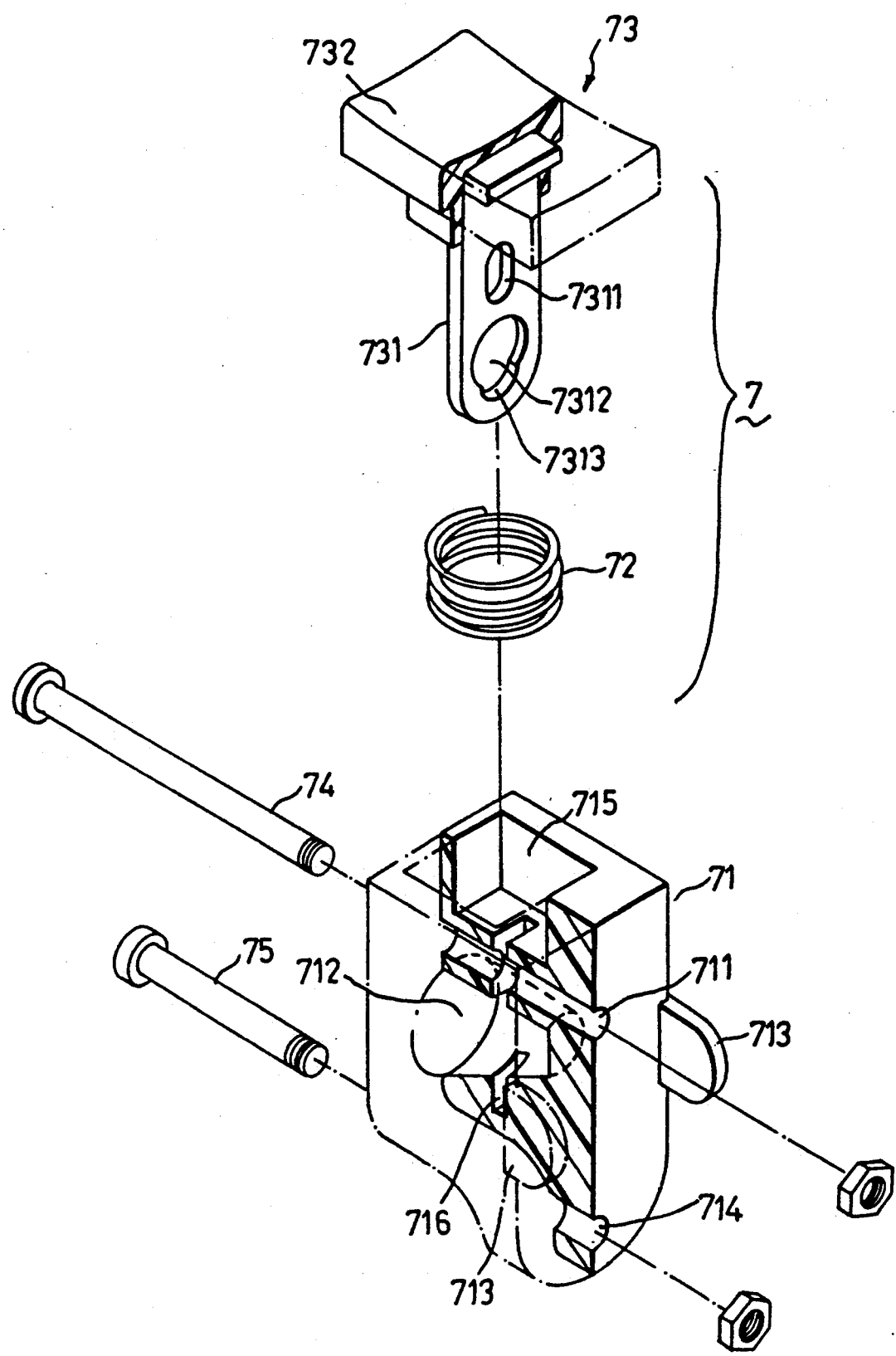
FIG. 9 shows an exploded view of a locking member of the locking device of the present invention.

Referring to FIG. 9, the lock casing (7) in this embodiment is sized so as to be received in the receiving space (11) of the stationary tube (1) when the push tube (6) is pivoted relative to the stationary tube (1) so as to retain the former in a parallel position relative to the latter. The lock casing (7) is an elongated member (71) which is fixed on the push tube (6) adjacent to the lower end of the latter and which has a cavity (715) formed at an upper portion thereof so as to receive a compression spring (72) therein. The lock casing (7) further has an elongated slot (716) that extends from the upper portion to a lower portion of the elongated member (71), and a blind bore (712) which passes transversely to the elongated slot (716) and which is adapted to receive the engaging bolt (3) therein. The elongated member (71) further has two through-holes (711, 714) and two flange members (713) which prevent the elongated member (71) from getting further into the receiving space (11) when the elongated member (71) is received in the receiving space (11).

A press member (73) is received in the cavity (715) of the elongated member (71) and which includes an enlarged head (732) which protrudes out of the elongated member (71) and an elongated plate (731) which is formed integrally with the enlarged head (732) and which extends through the compression spring (72) and the elongated slot (716). The elongated plate (731) has an oval-shaped opening (7311) and a circular opening (7312) which is larger than the tapered head (31) of the engaging bolt (3). A curved notch (7313) extends from the periphery of the circular opening (7312). A first locking bolt (74) extends through the through-hole (711) of the elongated member (71), the oval-shaped opening (7311) of the elongated plate (731) and the push tube (6), thereby locking the elongated plate (731) movably in the elongated member (71). A second locking bolt (75) extends through the through-hole (714) of the elongated member (71) and the push tube (6) so as to secure the elongated member (71) on the push tube (6). The compression spring (72) biases the press member (73) upward relative to the elongated member (71) in a normal condition.

Figure 12:
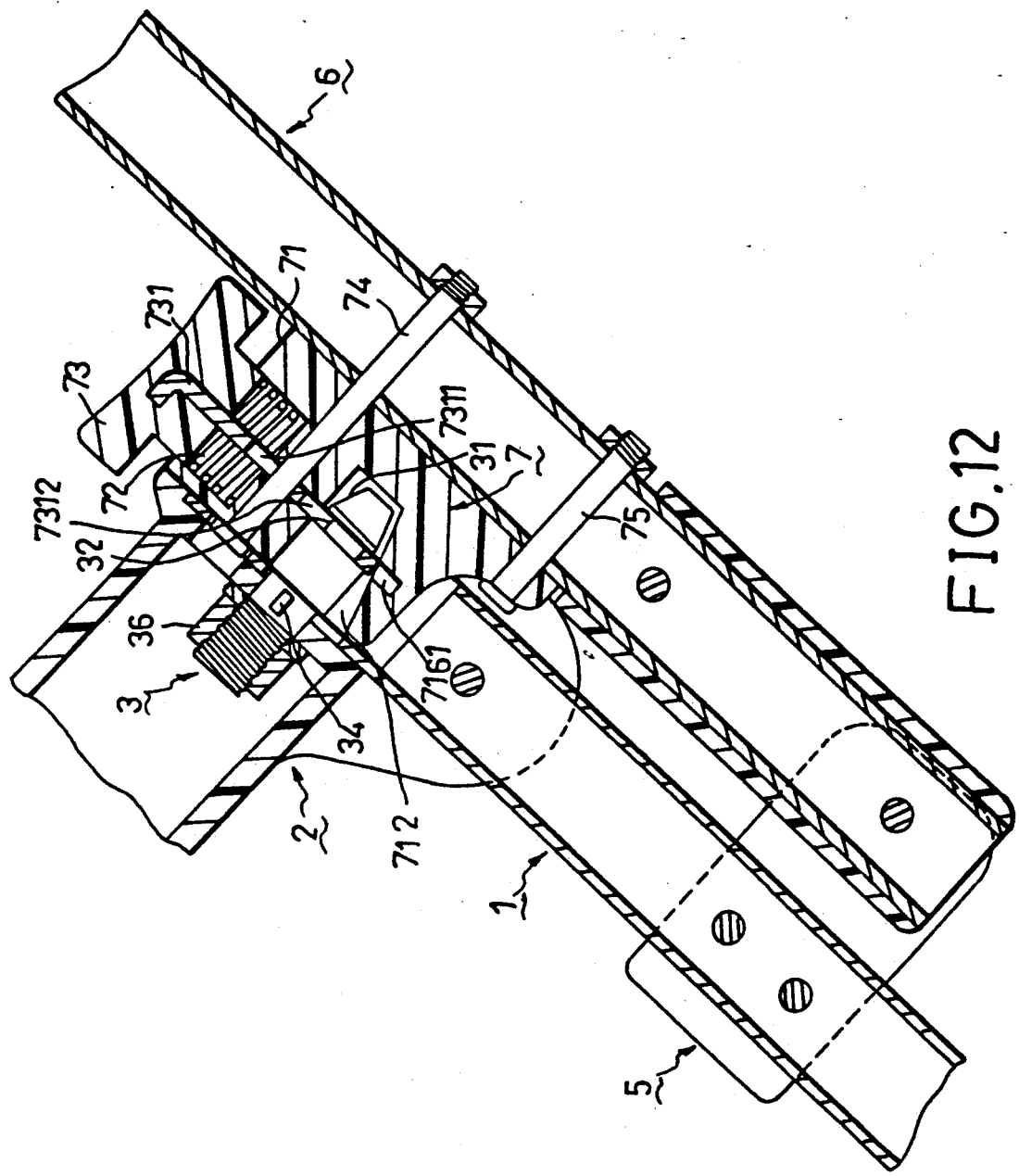
FIG. 12 shows the locking device of the present invention when used to lock together the stationary and push tubes of a golf trolley.

Referring to FIG. 12, when the push tube (6) is pivoted upward relative to the stationary tube (1) so as to be parallel with the latter, the elongated member (71) is received in the receiving space (11) that is defined by the stationary tube (1). Under this condition, the tapered head (31) of the engaging bolt (3) extends into the blind bore (712) of the elongated member (71) and pushes simultaneously and slidably the periphery of the circular opening (7312) of the elongated plate (731) of the press member (73), which action consequently causes the enlarged head (732) to compress the compression spring (72), thereby moving the elongated plate (731) of the press member (73) downward relative to the elongated member (71). When the engaging bolt (3) is fully received in the blind bore (712), the elongated plate (731) moves upward due to the restoration force of the compression spring (72). The periphery of the circular opening (7312) extends into the engaging groove (32) of the engaging bolt (3). Thus, the stationary tube (1) and the push tube (6) of the golf trolley are locked to one another so as to retain the golf trolley in an operable position. To disengage the two tubes (1, 6), the enlarged head (732) of the press member (73) is depressed so as to compress the compression spring (72) and permit the engaging bolt (3) to disengage the circular opening (7312) of the elongated plate (731) of the press member (73). Thus, the push tube (6) can be pivoted downward relative to the stationary tube (1) so as to place the golf trolley in a folded position, as shown in FIG. 11.

It has thus been shown that the user of the golf trolley which is equipped with the locking device of the present invention does not need to hold the locking casing (7) as required in the conventional golf trolley. The push tube is simply pivoted relative to the stationary tube when locking the push tube on the stationary tube. This facilitates the use of the golf trolley with the locking device of the present invention.

While a preferred embodiment has been illustrated and described, it will be apparent that many changes and modifications may be made in the general construction and arrangement of the present invention without departing from the spirit and scope thereof. Therefore, it is desired that the present invention be not limited to the exact disclosure but only to the extent of the appended claims.

I claim:

1. A locking device for a golf trolley, said golf trolley including a stationary tube with an upper end, a push tube having a lower end connected pivotally to said stationary tube adjacent to said upper end of said stationary tube, said locking device locking said stationary tube to said push tube to retain said golf trolley in an operable position, said locking device comprising:

an engaging bolt connected perpendicularly to said upper end of said stationary tube, said engaging bolt including a tapered head, a cylinder member having a first end connected to said tapered head and a second end connected to said upper end of said stationary tube, and an engaging groove formed between said tapered head and said cylinder member;

an elongated lock casing provided on said push tube adjacent to said lower end of said push tube, said lock casing having an upper portion, a lower portion opposite to said upper portion, a cavity formed at said upper portion, an elongated slot extending from said upper portion to said lower portion of said lock casing, and a blind bore passing transversely through said elongated slot and being adapted to receive said engaging bolt therein when said golf trolley is in the operable position;

a compression spring provided in said cavity of said lock casing; and a press member provided in said cavity of said lock casing, said press member having an enlarged head protruding out of said lock casing and an elongated plate which is connected to said enlarged head and which extends through said compression spring and said elongated slot of said lock casing, said elongated plate having an oval-shaped opening adjacent to said enlarged head to permit a locking bolt to extend therethrough so as to engage said press member movably in said lock casing, said elongated plate further having a circular opening adjacent to said oval-shaped opening and larger than said tapered head of said engaging bolt, said compression spring biasing said enlarged head to push said press member upward to an initial position;

whereby when said push tube is pivoted upward relative to said stationary tube so as to place said push tube in a substantially parallel position with respect to said stationary tube, said tapered end of said engaging bolt pushing slidably the periphery of said circular opening of said elongated plate of said press member, thereby compressing said compression spring and moving said press member downward relative to said lock casing, said press member moving upward due to a restoration force of said compression spring when the periphery of said circular opening of said press member extends into said engaging groove of said engaging bolt so as to engage said engaging bolt in said lock casing; and depression of said enlarged head of said press member and a downward pivotal action of said push tube relative to said stationary tube resulting in disengagement of said engaging bolt from said lock casing.

2. A locking device as claimed in claim 1, wherein said elongated plate of said press member further has a curved notch which extends from the periphery of said circular opening adjacent to a lower end of said elongated plate.

3. A locking device for locking a stationary tube and a push tube in a parallel position, said stationary tube having an upper end, said push tube having a lower end pivotally connected to said stationary tube adjacent to said upper end of said stationary tube, said locking device comprising:

an engaging bolt connected perpendicularly to said upper end of said stationary tube, said engaging bolt including a tapered head, a cylinder member having a first end connected to said tapered head and a second end connected to said upper end of said stationary tube, and an engaging groove formed between said tapered head and said cylinder member;

an elongated lock casing provided on said push tube adjacent to said lower end of said push tube, said lock casing having an upper portion, a lower portion opposite to said upper portion and a cavity formed at said upper portion, an elongated slot extending from said upper portion to said lower portion of said lock casing, and a blind bore passing transversely through said elongated slot and being adapted to receive correspondingly said engaging bolt therein when said push tube is locked to said stationary tube;

a compression spring provided in said cavity of said lock casing; and a press member provided in said cavity of said lock casing, said press member having an enlarged head protruding out of said lock casing and an elongated plate extending through said compression spring and said elongated slot of said lock casing, said elongated plate having an oval-shaped opening formed adjacent to said enlarged head to permit a locking bolt to extend therethrough so as to engage said press member movably in said lock casing, said elongated plate further having a circular opening which is larger than said tapered head of said engaging bolt, said compression spring biasing said enlarged head to push said press member upward relative to said lock casing to a normal position;

whereby when said push tube is pivoted upward relative to said stationary tube so as to place said push tube in a substantially parallel position with respect to said stationary tube, said tapered head of said engaging bolt pushing slidably the periphery of said circular opening of said elongated plate, thereby moving said press member downward relative to said lock casing, said elongated plate of said press member moving upward due to a restoration force of said compression spring when the periphery of said circular opening of said elongated plate extends into said engaging groove of said engaging bolt so as to lock said stationary tube to said push tube; and depression of said enlarged head of said press member and a downward pivotal action of said push tube relative to said stationary tube resulting in disengagement of said engaging bolt from said lock casing.

* * * * *